United States Patent
Lai et al.

(10) Patent No.: US 6,738,850 B2
(45) Date of Patent: May 18, 2004

(54) METHOD OF DOWNLOADING APPLICATION PROGRAMS ON THE EDITING SYSTEM PLATFORM OF AN ELECTRONIC COMMUNICATION APPARATUS

(75) Inventors: Cheng-Shing Lai, Taipei Hsieng (TW); Xiao-Long Fan, Taipei Hsieng (TW); Jing-Song Wu, Taipei Hsieng (TW)

(73) Assignee: Inventec Appliances Corp., Taipei Hsieng (TW)

( * ) Notice: Subject to any disclaimer, the term of this patent is extended or adjusted under 35 U.S.C. 154(b) by 546 days.

(21) Appl. No.: 09/855,498

(22) Filed: May 16, 2001

(65) Prior Publication Data

US 2002/0174280 A1 Nov. 21, 2002

(51) Int. Cl.$^7$ .................. G06F 13/24; G06F 12/00; G06F 15/16
(52) U.S. Cl. .............. 710/266; 711/200; 709/217
(58) Field of Search .................. 710/105, 106, 710/260, 266; 711/169, 170, 201–209, 213–215; 709/217, 227; 707/1, 104.1; 455/556.2

(56) References Cited

U.S. PATENT DOCUMENTS

| | | | | |
|---|---|---|---|---|
| 5,751,991 A | * | 5/1998 | Leach et al. ............ | 711/214 |
| 5,909,686 A | * | 6/1999 | Muller et al. ............ | 707/104.1 |
| 6,088,730 A | * | 7/2000 | Kato et al. .............. | 709/227 |
| 6,360,364 B1 | * | 3/2002 | Chen et al. ............. | 711/169 |

* cited by examiner

Primary Examiner—Khanh Dang
(74) Attorney, Agent, or Firm—Bacon & Thomas, PLC

(57) ABSTRACT

A method of downloading application programs on the editing system platform of an electronic communication apparatus, includes the step of connecting an electronic communication apparatus to the Internet, the step of driving an editing system of a processor of the electronic communication apparatus to define a total area from a memory thereof for use by the application programs to be downloaded from the Internet, for enabling the application programs to be stored in any address within the total area, the step of driving the editing system to directly correct the operating instruction of direct address searching to the correct address when downloading an application program from the Internet and then to search the address after address correction, and the step of using a software interrupt (SWI) to alternate the operating instruction of indirect address searching so as to obtain the desired correct address for the editing system for further indirect address searching operation.

9 Claims, 2 Drawing Sheets

METHOD OF DOWNLOADING APPLICATION PROGRAMS ON THE EDITING SYSTEM PLATFORM OF AN ELECTRONIC COMMUNICATION APPARATUS

BACKGROUND OF THE INVENTION

The present invention relates to electronic communication apparatus and, more specifically, to a method used in an electronic communication apparatus to download application programs from the Internet.

In recent years, the developing PDA (personal digital assistant) trends to thinner, lighter and compacter design. A new generation of PDA provides versatile functions, i.e., the functions of different electronic consumer goods are integrated to form a multipurpose electronic communication apparatus, for example, combining with a mobile telephone to form a PDA with mobile phone function, or combining with a modem to form an internet PDA. These versatile electronic communication apparatus commonly have the function of downloading application programs from the Internet. The editing system of these electronic communication apparatus executes either of the following two methods to download application programs from the Internet.

1. provide multiple connection addresses for every application program under downloading, so that the editing system can download every application program to the corresponding address code subject to actual requirements; or
2. Reserve a segment area from the system memory, so that the editing system can copy the application program to the segment area and then execute the program.

The aforesaid editing system application program downloading operating methods has drawbacks. In the aforesaid first method, the editing system needs to drive every application program to produce an address code corresponding to every different address segment when processing downloading, i.e., if the editing system provides 10 address segments for 10 application programs, every application program must provides 10 code numbers corresponding to the 10 address segments for use by the editing system when downloading the application programs. If to shift the application programs from one address segment to another during post procedures, it must download the code number matching the new address segment. This procedure is complicated. Further, in the aforesaid second method, the editing system must copy every application program to the preserved area and then execute the program. This complicated procedure results in low speed in application program execution. Further, because the preserved area has a space limitation, the size of the application program to be downloaded is limited.

SUMMARY OF THE INVENTION

The present invention has been accomplished to provide a method of downloading application programs on the editing system platform of an electronic communication apparatus, which eliminates the aforesaid drawbacks. It is one object of the present invention to provide a method of downloading application programs on the editing system platform of an electronic communication apparatus, which drives the editing system to scheme a total area from the memory for use by the application programs to be downloaded so that the downloaded application program can be stored in any address within the total area without leaving a particular space for executing the downloaded application programs, so that the copy action is eliminated during execution of the downloaded application programs and the downloaded application programs are free from the limitation of the memory space. It is another object of the present invention to provide a method of downloading application programs on the editing system platform of an electronic communication apparatus, which eliminates the editing system from providing multiple address segments for the downloaded application programs, so that the arrangement of the downloaded application programs is free from the constraint of the address and, the number of application programs to be downloaded is unlimited within the allowance of the total area. It is still another object of the present invention to provide a method of downloading application programs on the editing system platform of an electronic communication apparatus, which enables all downloaded application programs to be stored in any address in the schemed total area so that the downloaded application programs can easily be arranged, and the memory space can be fully utilized. It is still another object of the present invention to provide method of downloading application programs on the editing system platform of an electronic communication apparatus, which uses software to achieve interruption, so that no additional hardware equipment is required. The method of the present invention includes the step of connecting an electronic communication apparatus to the Internet, the step of driving an editing system of a processor of the electronic communication apparatus to define a total area from a memory thereof for use by the application programs to be downloaded from the Internet, for enabling the application programs to be stored in any address within the total area, the step of driving the editing system to directly correct the operating instruction of direct address searching to the correct address when downloading an application program from the Internet and then to search the address after address correction, and the step of using a software interrupt (SWI) to alternate the operating instruction of indirect address searching so as to obtain the desired correct address for the editing system for further indirect address searching operation.

DETAILED DESCRIPTION OF THE PREFERRED EMBODIMENT

Figure 1:
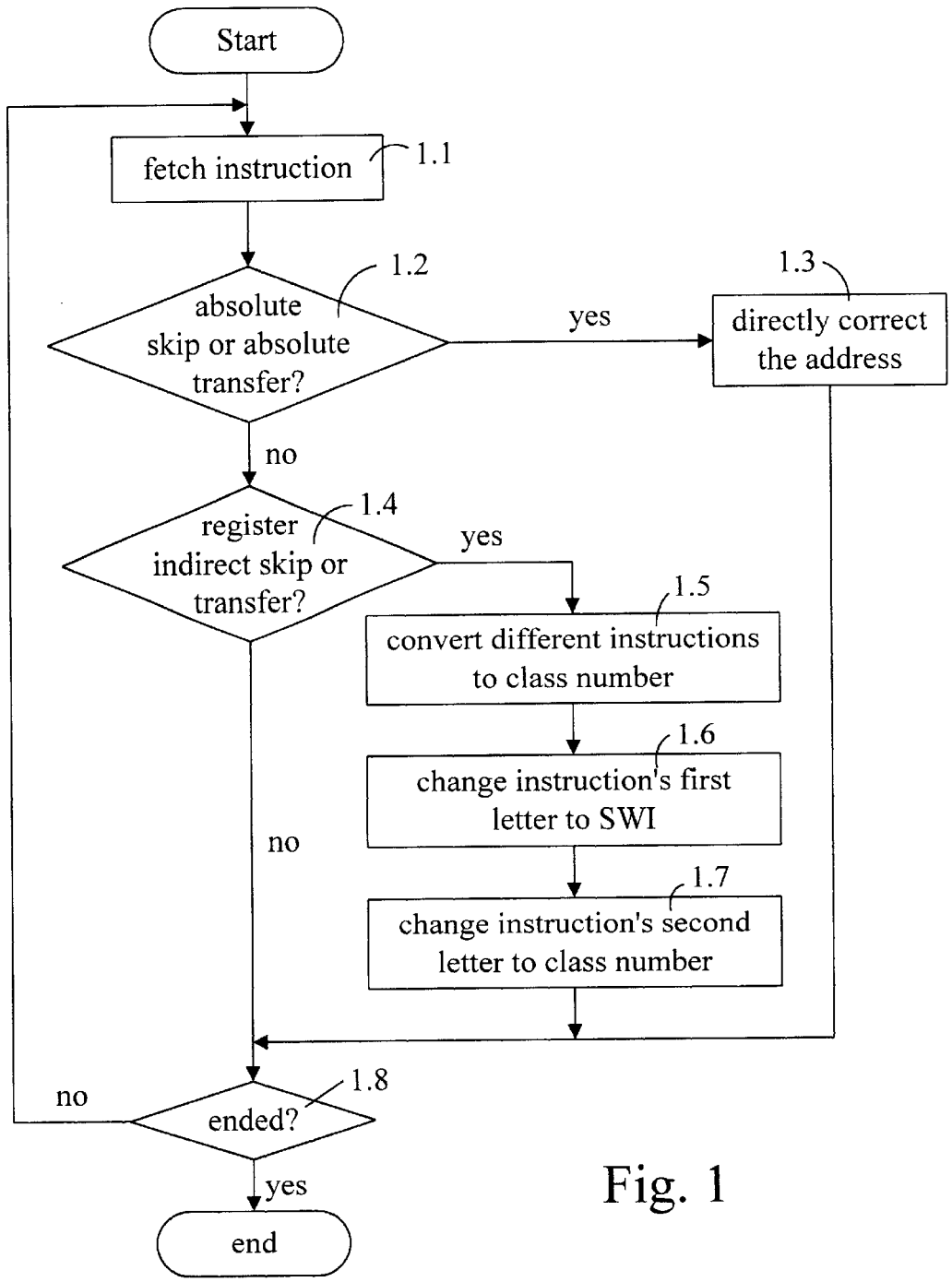
FIG. 1 is an instruction alternating flow chart according to the present invention.

The present invention is used in an electronic communication apparatus to download an application program from the Internet or a personal computer. The electronic communication apparatus can be a cellular phone, a personal digital assistant, or any of a variety of electronic communication apparatus. The electronic communication apparatus comprises a processor adapted to control the internal electronic components to function normally, so as to connect to a server in the Internet or a personal computer, enabling the editing system of the processor to down load an application program from the Internet. The invention drives the editing system to define an area from the memory in the electronic communication apparatus for use by the application program downloaded from the Internet, so that the application program can be stored in any address within the area, enabling the memory space to be fully utilized. The invention also drives the editing system to directly correct the operating instruction of direct address searching to the correct address and to search the address when downloading an application program from the Internet, or to use a software interrupt (SWI) to alternate the operating instruction of indirect address searching so as to obtain the desired correct address for the editing system and to further start indirect address searching operation.

In the preferred embodiment of the present invention, TOSHIBA #T900 processor is used to explain the design concept and operation flow of the present invention.

In the editing system used in the processor, there are three kinds of instructions concerning about the address, i.e., LD, JP and CALL. LD instructions include system total variation and constant. JP instructions are used to directly correct IP (instruction pointer) to change processing flow instructions. CALL instructions are used to compress current IP into the stack, and then to drive it to aim at the address being used by means of correcting IP, and then to fetch the IP default from the stack and to resume to the original address when returned to the main procedure. The difference between JP instructions and CALL instructions is that CALL instructions have IP reservation and resume functions. Because these three kinds of instructions affect data operating and processing flows, properly handling these three kinds of instructions enables the editing system to smoothly and accurately download an application program from the Internet.

In the present invention, the total variation and constant are stored in the fixed area during procedure execution of LD instructions, thus LD instructions can easily and properly be processed. With respect to JP and CALL instructions, they are divided into direct address searching (for example, JP 400000H, CALL 440000H . . . ) and indirect address searching (for example, JP XWA, CALL XHL . . . ) subject to the way of searching. Instructions of direct address searching can directly correct the address in the code to the correct address during application program download or transfer procedure, and drive the procedure to automatically produce an index document for recording the address searched by the instruction during the download process, so as to accelerate the procedure execution speed.

In the T900 processor, additional IP preservation and retrieval actions are required between JP instructions and CALL instruments because CALL instructed must return to the main procedure. Therefore, the editing system of the processor converts into editing procedure, so as to primarily compress the parameters into the stack one after another after execution of the editing procedure, and then to execute CALL action. After returned to the main procedure, the parameters are expelled out of the stack one after another. Based on this concept, the invention provides an instruction SWI (software interrupt) in the editing system to give a software interruption. The execution process of the software interruption is to compress IP into the stack, and then to aim the pointer at the corresponding interruption entrance address after the sign register has been compressed into the stack, and then to let IP be sent out of the stack after the sign register has been sent out of the stack when returning to the main procedure.

With respect to indirect address searching instructions, the invention uses register address searching for explanation. These instructions include JP<CC>, MEM and CALL<CC>, wherein MEM indicates the register. The length of these instructions is 2~5 bytes. In a linked binary file of application program, an instruction of 2 bytes is inserted to correct the content of the register, so as to further change the address. When using an instruction of 2 bytes to achieve this object, the following two processes must be done at first:

1. Instruction alternating process: Please refer to FIG. 1. During downloading of an application program, scan the downloaded binary code, and substitute SWI for JP<CC>, MEM or CALL<CC>, MEM, if any, and then put a class number to it. The class number is a pre-set code number. Different class numbers are used to define different types of instructions, so that the original operation mode is known when executing post procedures. The blank letter space is filled up with NOP.

2. Interruption service process: Please refer to FIG. 2. An interruption service function is provided to drive the procedure to skip to the corresponding interruption entrance address when executing SWI, and then to execute the service function, so as to fetch the content of the corresponding register subject to its class number and correct it to the correct value, for example, add an amount of bias subject to the address in which the application program is placed and put the value into the stack for serving as the return address for SWI, thus it skips to the desired address when returned after interruption. In case of a CALL instruction, it is necessary to insert CALL return address into the stack, for example, add 1 to SWI in the stack before modification, or figuring out subject to the class number.

In the flow of the aforesaid instruction alternating process, it scans the downloaded binary code at first, and then starts the related instruction alternating process subject to the following steps as shown in FIG. 1:

(1.1) Read the instruction;

(1.2) Judge if the address searching mode of the instruction is of absolute skip or absolute transfer, i.e., if it is of direct address searching; if positive, enter step the next step, or enter step (1.4) if negative;

(1.3) Directly correct the skip address to the accurate address and then enter step (1.8) in case of direct address searching;

(1.4) If not direct address searching, judge if it is register's indirect skip or transfer? and then enter the next step if positive, or enter step (1.8) if negative;

(1.5) In case of register's indirect address searching, change the instruction to a different class number. The class number is a pre-set code number of the present invention, and different class numbers are used to define different types of instructions;

(1.6) Change the first letter of the instruction to software interruption sign SI;

(1.7) Change the second letter of the instruction to class number;

(1.8) Judge if the binary code scanning process has been ended or not? If not, return to step (1.1) and then pick up the next instruction until the end of the scan, or terminate the instruction alternating procedure.

Figure 2:
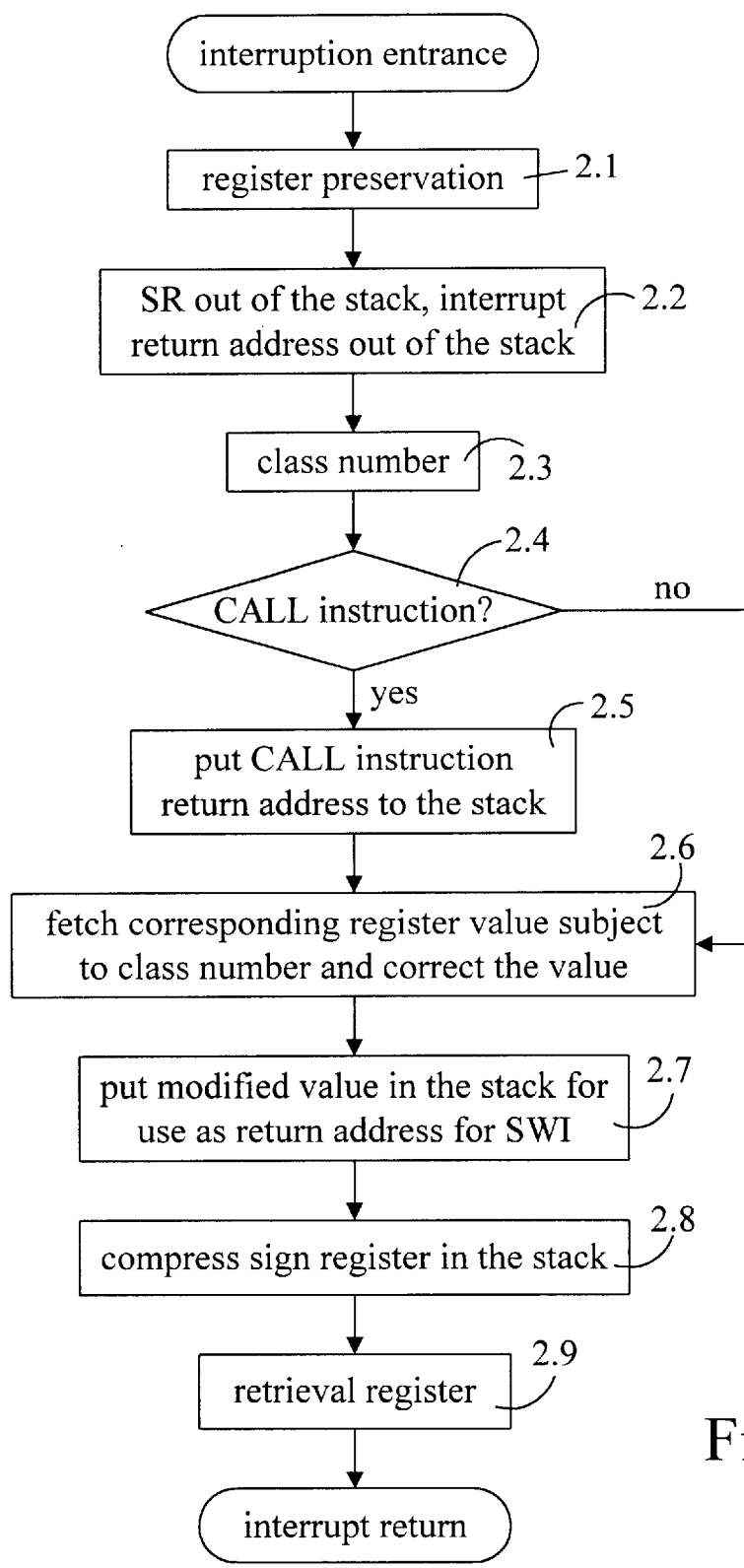
FIG. 2 is an interruption service flow chart according to the present invention.

In the flow of the aforesaid interruption service process, the invention provides an interruption service function, so that the procedure skips to the corresponding interruption entrance when reaching SWI, and then executes the interruption service function subject to the following steps as shown in FIG. 2:

(2.1) At first, preserve all content of the register in the defined variation, i.e., store the content in the memory space, so as to ensure accurate operation of the procedure when returned after interruption;

(2.2) Eject sign resister SR out of the stack, so as to keep the value for retrieval in further procedure, and then eject interruption return address out of the stack for correcting to a new return address and putting in the stack in the further procedure;

(2.3) Read the class number;

(2.4) Judge if the instruction is a CALL instruction or not subject to its class number, and then enter the next step if positive, or enter step (2.6) if negative;

(2.5) In case of CALL instruction, CALL instruction must be returned to the original procedure when executed, therefore add 1 to the return address of SWI and then put it into the stack for preservation;

(2.6) Fetch the corresponding value from the register subject to the class number, and then correct it to the accurate address, i.e., add an amount of bias subject to the address in which the software program is placed;

(2.7) Use the modified value as the return address for SWI, and then compress the modified value into the stack, so that when returned after interruption, the procedure skips to the address and then continues the execution, and therefore JP or CALL instruction is finished and, the address correction is done;

(2.8) Compress the content of sign register SR into the stack, at this time the sign register is not modified, therefore the content value of the sign register is maintained accurate;

(2.9) Change the content preserved in the register subject to step (2.1) to the original value, i.e., transfer the original value from the variation to the register, enabling the content of the register to be returned to the original unmodified value after interruption, and then end the interruption procedure and return to the main procedure.

Thus, the editing system of the electronic communication apparatus needs only to scheme the total area of the memory space for enabling the downloaded program to be stored in any address in the total area, without leaving a particular space for executing the downloaded application program. It eliminates the action of copy when executing the application software. Therefore, the execution efficiency and speed are greatly improved, and the downloaded application program is free from the constraint of the memory space left. Further, because the editing system needs not to provide multiple address segments for the downloaded application programs, the arrangement of the downloaded application programs is free from the constraint of the address, and the number of application programs to be downloaded to the total area is not limited. This design greatly improves the convenience of use. Further, because the editing system uses software to achieve interruption and indirect address searching operations, no additional hardware equipment is required.

What the invention claimed is:

1. A method of downloading application programs on an editing system platform of an electronic communication apparatus, comprising the step of connecting an electronic communication apparatus to the Internet, the step of driving an editing system of a processor of said electronic communication apparatus to define a total area from a memory thereof for use by the application programs to be downloaded from the Internet, for enabling the application programs to be stored in any address within said total area, the step of driving said editing system to directly correct the operating instruction of direct address searching to the correct address when downloading an application program from the Internet and then to search the address after address correction, and the step of using a software interrupt (SWI) to alternate the operating instruction of indirect address searching so as to obtain the desired correct address for said editing system for further indirect address searching operation.

2. The method of claim 1 wherein the step of driving said editing system to directly correct the operating instruction of direct address searching to the correct address when downloading an application program from the Internet is to directly correct code address to the accurate address, enabling the procedure to automatically produce an index document for recording the address searched by the instruction.

3. The method of claim 1 wherein the step of using a software interrupt (SWI) to alternate the operating instruction of indirect address searching is to scan the binary code of the downloaded application program, and then use the software interrupt to alternate the operating instruction of indirect address searching if any, and then add a class number to the end of the instruction for recognition of the original operating mode during execution of post procedures.

4. The method of claim 3 wherein it skips to the corresponding interruption entrance address when executing to the software interrupt to execute an interruption service function, and then fetch the content of the corresponding register subject to the class number, and then correct the value of the content to the correct value, and then put the value to the stack for use as the return address for the software interrupt, so that the procedure skips to the desired address when returned after interruption.

5. The method of claim 4 wherein said correct value is obtained by adding a bias amount to the content fetched from the corresponding register, said bias amount being calculated subject to the address in which the application program is put.

6. The method of claim 3 wherein when alternating operating instruction of indirect address searching, it scans the downloaded binary code at first, and then starts the related instruction alternating process as follows:

(a) read the instruction;

(b) judge if the address searching mode of the instruction is of absolute skip or absolute transfer, (c) directly correct the skip address to the accurate address and then judge neither if the binary code scanning procedure has been ended nor not in case the instruction is of direct address searching, and then fetch the next instruction if the scanning procedure still continues, or terminate the instruction alternating procedure if the instruction is not of direct address searching.

7. The method of claim 6 wherein if the instruction is not direct address searching, it includes the sub-steps as follows:

(a) judging if the instruction is of register's indirect skip or transfer;

(b) changing change the instruction to a different class number if the instruction is of register's indirect address searching, said class number being a pre-set code number and different class numbers being used to define different types of instructions;

(c) changing the first letter of the instruction to software interruption sign SI;

(d) changing the second letter of the instruction to class number;

(e) judging if the binary code scanning process has been ended or not, and then reading the next instruction if not ended, or terminating the instruction alternating procedure.

8. The method of claim 4 wherein during the procedure of interruption service process, it provides an interruption service function, so that the procedure skips to the corresponding interruption entrance when reaching SWI, and then executes the interruption service function subject to the steps of:

(a) at first, preserve all content of the register in the defined variation, i.e., store the content in the memory space, so as to ensure accurate operation of the procedure when returned after interruption;

(b) eject sign resister SR out of the stack, so as to keep the value for retrieval in further procedure, and then eject interruption return address out of the stack for correcting to a new return address and putting in the stack in the further procedure;

(c) fetch the class number, and judge if the instruction is of the type to be returned to the main procedure, and then return it to the address, which is the return address of the software interruption before modification plus 1 and compressed into the stack for preservation;

(d) correct the value fetched from the corresponding register subject to the class number to the accurate address, i.e., add an amount of bias subject to the address in which the software program is placed;

(e) use the modified value as the return address for the software interrupt, and then compress the modified value into the stack, so that when returned after interruption, the procedure skips to the address and then continues the execution; and (f) at final, compress the content of sign register into the stack, and change the content been preserved in the register to the original value, and then end the interruption procedure and return to the main procedure.

9. The method of claim 8 wherein if the instruction is not of the type to be returned to the main procedure, it fetches the value of the corresponding register subject to the class number of the instruction, and then corrects the value to the accurate address, i.e., to add to the value an amount of bias calculated subject to the address in which the application program is placed, and then uses the modified value as the return address for the software interrupt, and then compress the modified value into the stack, so that when returned after interruption, the procedure skips to the address and then continues the execution; and at final, it compresses the content of sign register into the stack, and changes the content been preserved in the register to the original value, and then ends the interruption procedure and return to the main procedure.

* * * * *